United States Patent
Eshleman et al.

(10) Patent No.: US 10,402,421 B2
(45) Date of Patent: *Sep. 3, 2019

(54) SYSTEMS AND METHODS FOR INTEREST-DRIVEN DATA SHARING IN INTEREST-DRIVEN BUSINESS INTELLIGENCE SYSTEMS

(71) Applicant: Workday, Inc., Pleasanton, CA (US)

(72) Inventors: John Glenn Eshleman, Mountain View, CA (US); Kevin Scott Beyer, San Francisco, CA (US); Brian F. Babcock, Palo Alto, CA (US); Carl-Christian Kanne, Campbell, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,622

(22) Filed: Aug. 11, 2017

(65) Prior Publication Data

US 2018/0067999 A1 Mar. 8, 2018

Related U.S. Application Data

(63) Continuation of application No. 13/791,042, filed on Mar. 8, 2013, now Pat. No. 9,767,173.

(Continued)

(51) Int. Cl.
*G06F 16/25* (2019.01)
*G06F 16/27* (2019.01)
*G06F 16/21* (2019.01)

(52) U.S. Cl.
CPC .......... *G06F 16/254* (2019.01); *G06F 16/217* (2019.01); *G06F 16/27* (2019.01)

(58) Field of Classification Search
CPC ......... G06F 17/30283; G06F 17/30563; G06F 17/30306; G06F 16/254; G06F 16/217; G06F 16/27
See application file for complete search history.

(56) References Cited

U.S. PATENT DOCUMENTS 6,112,197 A    8/2000  Chatterjee
6,282,548 B1 * 8/2001  Burner ................ G06F 17/3089
(Continued)

FOREIGN PATENT DOCUMENTS

EP    2040180      3/2009
WO    2007072501   6/2007
(Continued)

OTHER PUBLICATIONS

Negash et al., "Business Intelligence", Ninth Americas Conference on Information Systems, 2003, pp. 3190-3199.
(Continued)

*Primary Examiner* — Hasanul Mobin
(74) *Attorney, Agent, or Firm* — Van Pelt, Yi & James LLP

(57) ABSTRACT

Systems and methods for interest-driven data sharing in interest-driven business intelligence systems in accordance with embodiments of the invention are illustrated. In one embodiment, an interest-driven data sharing server system includes a processor, a memory configured to store an interest-driven data sharing application, raw data storage, metadata storage configured to store data description metadata describing the raw data, and report storage configured to store previously generated reports, wherein the interest-driven data sharing application configures the processor to receive a report specification, locate at least one previously generated report stored in the report storage, identify raw data stored in the raw data storage using the data description metadata and at least one of the reporting data requirements,
(Continued)

calculate redundant data metadata using the located previously generated reports and the identified raw data, determine modified reporting data requirements, retrieve updated source data, and generate reporting data based on the updated source data.

18 Claims, 6 Drawing Sheets

Related U.S. Application Data

(60) Provisional application No. 61/717,096, filed on Oct. 22, 2012.

(56) References Cited

U.S. PATENT DOCUMENTS

| | | | |
|---|---|---|---|
| 6,349,138 | B1 | 2/2002 | Doshi |
| 6,609,123 | B1* | 8/2003 | Cazemier ............... G06F 16/289 |
| 6,842,758 | B1* | 1/2005 | Bogrett ............. G06F 16/24534 |
| 7,151,438 | B1 | 12/2006 | Hall |
| 7,168,953 | B1 | 1/2007 | Poggio |
| 7,209,923 | B1 | 4/2007 | Cooper |
| 7,272,660 | B1 | 9/2007 | Powers |
| 7,275,053 | B1 | 9/2007 | Gardner |
| 7,293,031 | B1 | 11/2007 | Dusker |
| 7,315,849 | B2 | 1/2008 | Bakalash |
| 7,412,481 | B2 | 8/2008 | Nicholls |
| 7,430,562 | B1* | 9/2008 | Bedell ............... G06F 16/24542 |
| 7,565,335 | B2 | 7/2009 | Tang |
| 7,702,615 | B1 | 4/2010 | Delurgio |
| 7,945,852 | B1 | 5/2011 | Pilskalns |
| 8,032,485 | B2 | 10/2011 | Alvarez |
| 8,068,986 | B1* | 11/2011 | Shahbazi ............... H04L 63/126 |
| | | | 342/28 |
| 8,156,101 | B2 | 4/2012 | Indeck |
| 8,165,146 | B1* | 4/2012 | Melick ................. H04B 1/7163 |
| | | | 370/390 |
| 8,217,945 | B1* | 7/2012 | Moscovici ............ G06Q 50/01 |
| | | | 345/440 |
| 8,260,840 | B1 | 9/2012 | Sirota |
| 8,261,193 | B1 | 9/2012 | Alur |
| 8,266,148 | B2 | 9/2012 | Guha |
| 8,447,721 | B2 | 5/2013 | Eshleman |
| 9,405,812 | B2 | 8/2016 | Schuster |
| 2002/0059264 | A1 | 5/2002 | Fleming |
| 2002/0107957 | A1* | 8/2002 | Zargham ............... G06Q 10/06 |
| | | | 709/224 |
| 2003/0030733 | A1 | 2/2003 | Seaman |
| 2004/0059701 | A1 | 3/2004 | Fedorov |
| 2004/0138935 | A1* | 7/2004 | Johnson ........... G06Q 10/06375 |
| | | | 705/7.37 |
| 2004/0164961 | A1 | 8/2004 | Bal |
| 2004/0174397 | A1 | 9/2004 | Cereghini |
| 2005/0187974 | A1 | 8/2005 | Gong |
| 2005/0228728 | A1 | 10/2005 | Stromquist |
| 2006/0112123 | A1 | 5/2006 | Clark |
| 2007/0021992 | A1 | 1/2007 | Konakalla |
| 2007/0027904 | A1* | 2/2007 | Chow ............... G06F 17/30427 |
| 2007/0078960 | A1 | 4/2007 | Dawson |
| 2007/0136683 | A1 | 6/2007 | Heidari |
| 2007/0156718 | A1 | 7/2007 | Hossfeld |
| 2008/0005677 | A1 | 1/2008 | Thompson |
| 2008/0109235 | A1 | 5/2008 | Binnie |
| 2008/0201653 | A1* | 8/2008 | Khandekar ............ G06Q 40/04 |
| | | | 715/765 |
| 2008/0294996 | A1 | 11/2008 | Hunt |
| 2008/0313345 | A1 | 12/2008 | Bernardin |
| 2009/0083306 | A1 | 3/2009 | Sichi |
| 2009/0096812 | A1 | 4/2009 | Boixel |
| 2009/0172006 | A1 | 7/2009 | Ducaule |
| 2009/0248631 | A1 | 10/2009 | Alba |
| 2010/0100952 | A1 | 4/2010 | Sample |
| 2010/0211895 | A1* | 8/2010 | Mistry ................... G06Q 10/06 |
| | | | 715/764 |
| 2010/0251100 | A1 | 9/2010 | Delacourt |
| 2010/0287146 | A1 | 11/2010 | Skelton |
| 2011/0004830 | A1 | 1/2011 | Von Kaenel |
| 2011/0047525 | A1 | 2/2011 | Castellanos |
| 2011/0131270 | A1 | 6/2011 | Statchuk |
| 2011/0137850 | A1 | 6/2011 | Mourey |
| 2011/0145287 | A1 | 6/2011 | Jiang |
| 2011/0246449 | A1 | 10/2011 | Collins |
| 2011/0261049 | A1 | 10/2011 | Cardno |
| 2011/0282690 | A1 | 11/2011 | Patel |
| 2011/0313969 | A1 | 12/2011 | Ramu |
| 2012/0130987 | A1 | 5/2012 | Bose |
| 2012/0169713 | A1 | 7/2012 | Gao |
| 2012/0179742 | A1 | 7/2012 | Acharya |
| 2012/0239609 | A1 | 9/2012 | Zhao |
| 2013/0013552 | A1 | 1/2013 | Eshleman |
| 2013/0018671 | A1 | 1/2013 | Hussam |
| 2013/0086104 | A1 | 4/2013 | Morrison |
| 2013/0103677 | A1 | 4/2013 | Chakra |
| 2013/0136416 | A1 | 5/2013 | Sathish |
| 2013/0226860 | A1 | 8/2013 | Eshleman |
| 2013/0238551 | A1 | 9/2013 | Eshleman |
| 2014/0114909 | A1 | 4/2014 | Schuster |
| 2014/0114970 | A1 | 4/2014 | Prabu |
| 2014/0258209 | A1 | 9/2014 | Eshleman |
| 2014/0282184 | A1 | 9/2014 | DeWan |
| 2015/0081353 | A1 | 3/2015 | Schuster |
| 2015/0081618 | A1 | 3/2015 | Schuster |
| 2015/0081619 | A1 | 3/2015 | Brown |
| 2015/0112969 | A1 | 4/2015 | Prabhu |

FOREIGN PATENT DOCUMENTS

| | | |
|---|---|---|
| WO | 2008092149 | 7/2008 |
| WO | 2013130870 | 9/2013 |
| WO | 2014066051 | 5/2014 |
| WO | 2014066052 | 5/2014 |
| WO | 2014137413 | 9/2014 |
| WO | 2015041714 | 3/2015 |
| WO | 2015041731 | 3/2015 |
| WO | 2015041735 | 3/2015 |
| WO | 2015060892 | 4/2015 |
| WO | 2015060893 | 4/2015 |

OTHER PUBLICATIONS

Borthakur et al., 'Apache Hadoop Goes Realtime at Facebook', SIGMOD '11 Proceedings of the 2011 ACM SIGMOD International Conference on Management of data, 1071-1080.

Cohen, Jeffrey et al., 'MAD Skills: New Analysis Practices for Big Data', Proceedings of the VLDB Endowment, vol. 2 Issue 2, Aug. 2009, 1481-1492.

Condie, Tyson et al., 'MapReduce Online', Nsdi. vol. 10. No. 4. 2010. Available online at http://www.eecs.berkeley.edu/Pubs/TechRpts/2009/EECS-2009-136.html, 1-15.

Extended European Search Report for European Application EP13754225.4, Report Completed May 4, 2015, dated May 13, 2015, 4 Pgs.

International Preliminary Report on Patentability for International Application PCT/US2013/028402, report completed Apr. 23, 2013, dated Sep. 12, 2014, 6 Pgs., Sep. 12, 2014.

International Preliminary Report on Patentability for International Application PCT/US2013/064271, Report dated Apr. 28, 2015, dated May 7, 2015, 9 Pgs.

International Preliminary Report on Patentability for International Application PCT/US2013/064272, Report dated Apr. 28, 2015, dated May 7, 2015, 5 Pgs.

International Preliminary Report on Patentability for International Application PCT/US2013/067815, Report dated Sep. 8, 2015, dated Sep. 17, 2015, 9 Pgs.

International Preliminary Report on Patentability for International Application PCT/US2014/022060, Report dated Mar. 22, 2016, dated Mar. 31, 2016, 8 Pgs.

(56) References Cited

OTHER PUBLICATIONS

International Preliminary Report on Patentability for International Application PCT/US2014/029149, Report dated Apr. 26, 2016, dated May 6, 2016, 9 Pgs.

International Preliminary Report on Patentability for International Application PCT/US2014/029191, Report dated Apr. 26, 2016, dated May 6, 2016, 9 Pgs.

International Preliminary Report on Patentability for International Application PCT/US2014/042488, Report dated Mar. 22, 2016, dated Mar. 31, 2016, 8 Pgs.

International Preliminary Report on Patentability for International Application PCT/US2014/044050, Report dated Mar. 22, 2016, dated Mar. 31, 2016, 6 Pgs.

International Search Report and Written Opinion for International Application PCT/US13/64271, report completed Mar. 26, 2014, dated Apr. 18, 2014, 10 Pgs.

International Search Report and Written Opinion for International Application PCT/US13/64272, report completed Mar. 28, 2014, dated Apr. 21, 2014, 6 Pgs.

International Search Report and Written Opinion for International Application PCT/US14/22060, report completed Jun. 23, 2014 dated Jul. 21, 2014, 9 Pgs.

International Search Report and Written Opinion for International Application PCT/US14/29149, report completed Jul. 22, 2014, dated Aug. 25, 2014, 9 Pages.

International Search Report and Written Opinion for International Application PCT/US14/29191, report completed Jun. 30, 2014, dated Aug. 15, 2014, 9 Pages.

International Search Report and Written Opinion for International Application PCT/US14/42488, report completed Sep. 25, 2014, dated Oct. 30, 2014, 9 Pgs., Oct. 30, 2014.

International Search Report and Written Opinion for International Application PCT/US14/44050, report completed Oct. 3, 2014, dated Oct. 15, 2014, 7 Pgs., Oct. 15, 2014.

International Search Report and Written Opinion for International Application PCT/US2013/028402, completed Apr. 22, 2013, 7 pgs.

International Search Report and Written Opinion for International Application PCT/US2013/067815, completed Apr. 14, 2014, 11 pgs.

International Search Report and Written Opinion for International Application PCT/US2014/027875, report completed Jul. 15, 2014, dated Aug. 19, 2014, 9 Pages.

Karabegovic, Almir et al., 'Geoportal as Decision Support System with Spatial Data Warehouse', [online] published 2012. [retrieved on Oct. 3, 2014 (Oct. 3, 2014)] Retrieved from the Internet<URL: https://fedcsis.org/proceedings/2012/pliks/111.pdf> entire document, 2012, 4 Pages.

Kossmann, Donald , 'The State of the Art in Distributed Query Processing', ACM Computing Surveys, vol. 32 Issue 4, Dec. 2000, Dec. 2000, 422-469.

Metwally, Ahmed et al., "Efficient computation of frequent and top-k elements in data streams." International Conference on Database Theory. Springer, Berlin, Heidelberg, 2005.

Morfonios, Konstantinos et al., 'ROLAP Implementations of the Data Cube', ACM Computing Surveys, vol. 39, No. 4, Article 12, 2007, Oct. 2007, 12:1-12:53.

Nandi, Arnab et al., 'Guided Interaction: Rethinking the Query-Result Paradigm', Proceedings of the VLDB Endowment, vol. 4, No. 12, Aug. 2011, 1466-1469.

Shvachko et al., 'The Hadoop Distributed File System', 2010 IEEE 26th Symposium on Mass Storage Systems and Technologies (MSST), 1-10.

\* cited by examiner

SYSTEMS AND METHODS FOR INTEREST-DRIVEN DATA SHARING IN INTEREST-DRIVEN BUSINESS INTELLIGENCE SYSTEMS

CROSS-REFERENCE TO RELATED APPLICATIONS

This application is a continuation of co-pending U.S. patent application Ser. No. 13/791,042, entitled SYSTEMS AND METHODS FOR INTEREST-DRIVEN DATA SHARING IN INTEREST-DRIVEN BUSINESS INTELLIGENCE SYSTEMS, filed Mar. 8, 2013, which claims priority to U.S. Provisional Patent Application No. 61/717,096, entitled SYSTEMS AND METHODS FOR INTEREST-DRIVEN DATA SHARING IN INTEREST-DRIVEN BUSINESS INTELLIGENCE SYSTEMS, filed Oct. 22, 2012, both of which are hereby incorporated by reference for all purposes.

FIELD OF THE INVENTION

The present invention relates to business intelligence systems, specifically the sharing of data generated using interest-driven business intelligence systems.

BACKGROUND

Business intelligence refers to techniques for identifying, processing, and analyzing business data. Business intelligence systems can provide historical, current, and predictive views of business operations. Business data, generated during the course of business operations, including data generated from business processes and the additional data created by employees and customers, may be structured, semi-structured, or unstructured depending on the context and knowledge surrounding the data. In many cases, data generated from business processes is structured, whereas data generated from customer interactions with the business is semi-structured or unstructured. Due to the amount of data generally generated during the course of business operations, business intelligence systems are commonly built on top of and utilize a data warehouse.

Data warehouses are utilized to store, analyze, and report data, for example, business data. Data warehouses utilize databases to store, analyze, and harness the data in a productive and cost-effective manner. A variety of databases are commonly utilized, such as a relational database management system (RDBMS), such as the Oracle Database from the Oracle Corporation of Santa Clara, Calif., or a massively parallel processing analytical database, such as Teradata from the Teradata Corporation of Miamisburg, Ohio. Business intelligence (BI) and analytical tools, such as SAS from SAS Institute, Inc. of Cary, N.C., are used to access the data stored in the database and provide an interface for developers to generate reports, manage and mine the stored data, perform statistical analysis, business planning, forecasting, and other business functions. Most reports created using BI tools are created by database administrators, and the underlying database may be tuned for the expected access patterns. A database administrator may index, pre-aggregate or restrict access to specific relations, allow ad-hoc reporting and exploration.

A snowflake schema is an arrangement of tables in a RDBMS, with a central fact table connected to one or more dimension tables. The dimension tables in a snowflake schema are normalized into multiple related tables—for a complex schema there will be many relationships between the dimension tables, resulting in a schema which looks like a snowflake. A star schema is a specific form of a snowflake schema having a fact table referencing one or more dimension tables. However, in a star schema, the dimensions are normalized into a single table—the fact table is the center and the dimension tables are the "points" of the star.

Online transaction processing (OLTP) systems are designed to facilitate and manage transaction-based applications. OTLP may refer to a variety of transactions such a database management system transactions, business, or commercial transactions. OLTP systems typically have low latency response to user requests.

Online analytical processing (OLAP), a modification of OLTP, is an approach to answering multidimensional analytical queries. OLAP tools enable users to analyze multidimensional data utilizing three basic analytical operations: consolidation (aggregating data), drill-down (navigating details of data), and slice and dice (take specific sets of data and view from multiple viewpoints). The basis for any OLAP system is an OLAP cube. An OLAP cube is a data structure allowing for fast analysis of data with the capability of manipulating and analyzing data from multiple perspectives. OLAP cubes typically are composed of numeric facts, called measures, categorized by dimensions. These facts and measures are commonly created from a star schema or a snowflake schema of tables in a RDBMS.

SUMMARY OF THE INVENTION

Systems and methods for interest-driven data sharing in interest-driven business intelligence systems in accordance with embodiments of the invention are illustrated. In one embodiment, an interest-driven data sharing server system includes a processor, a memory connected to the processor and configured to store an interest-driven data sharing application, raw data storage configured to store raw data, where a portion of the raw data includes unstructured data, metadata storage configured to store data description metadata describing the raw data, and report storage configured to store previously generated reports including previous reporting data and previous reporting data requirements, wherein the interest-driven data sharing application configures the processor to receive a report specification, where the report specification includes at least one reporting data requirement, locate at least one previously generated report stored in the report storage using the previously reporting data requirements and the at least one reporting data requirement, identify raw data stored in the raw data storage using the data description metadata and at least one of the reporting data requirements, calculate redundant data metadata using the located previously generated reports and the identified raw data, where the redundant data metadata identifies data common to the identified raw data and the previous reporting data in the located previously generated reports, determine modified reporting data requirements, where the modified reporting data requirements exclude the common data identified by the redundant data metadata, retrieve updated source data from the raw data storage using the modified reporting data requirements, and generate reporting data based on the updated source data and the previous reporting data contained in at least one of the at least one previously generated reports.

In another embodiment of the invention, the interest-driven data sharing application configures the processor to generate the reporting data utilizing an interest-driven data pipeline, where the interest-driven data pipeline is configured to aggregate the updated data and the previous reporting data based on the report specification.

In an additional embodiment of the invention, the raw data storage is separate and remote from the interest-driven data sharing server system and the interest-driven data sharing application configures the processor to generate a data source job configured to retrieve updated source data from the raw data storage.

In yet another additional embodiment of the invention, the data source job configures the raw data storage to generate aggregate data based on raw data, where a portion of the raw data includes unstructured data.

In still another additional embodiment of the invention, the interest-driven data sharing server system further includes a data dimension directory, where the data dimension directory includes a plurality of data dimensions associated with the previously generated reports, wherein the at least one reporting data requirement includes at least one reporting data dimension, and wherein the interest-driven data sharing application configures the processor to calculate redundant metadata based on the data dimension directory and the at least one reporting data requirement.

In yet still another additional embodiment of the invention, the interest-driven data sharing application configures the processor to update the data dimension directory based on the generated reporting data.

In yet another embodiment of the invention, the interest-driven data sharing application configures the processor to retrieve updated source data from the raw data storage using the modified reporting data requirements, where the updated source data fulfills a portion of the modified reporting data requirement, generate partial reporting data based on the updated source data and the previous reporting data contained in at least one of the at least one previously generated reports, retrieve supplemental source data from the raw data storage, where the supplemental source data fulfills the remaining portion of the modified reporting data requirement, and generate reporting data using the partial reporting data and the supplemental source data.

In still another embodiment of the invention, the interest-driven data sharing server system includes aggregate data storage configured to store aggregate data, wherein the updated source data includes aggregate data, and wherein the interest-driven data sharing application configures the processor to store the updated source data using the aggregate data storage.

In yet still another embodiment of the invention, at least one of the at least one reporting data requirement includes data source metadata identifying at least one data source, where the at least one data source is configured to store raw data and the interest-driven data sharing application configures the processor to retrieve updated source data from the at least one data source.

In yet another additional embodiment of the invention, the report data storage is separate from the interest-driven data sharing server system and the interest-driven data sharing application configures the processor to generate data mapping metadata, where the data mapping metadata identifies correspondences between the previous reporting data requirements and the received report specification using the data description metadata, calculate redundant data metadata using the located previously generated reports and the identified raw data based on the data mapping metadata, and generate reporting data based on the updated source data and the previous reporting data contained in at least one of the at least one previously generated reports based on the data mapping metadata.

Still another embodiment of the invention includes a method for interest-driven data sharing, including receiving a report specification using an interest-driven data sharing server system, where the report specification includes at least one reporting data requirement, locating at least one previously generated report stored in the report storage based on the previously reporting data requirements and the at least one reporting data requirement using the interest-driven data sharing server system, identifying raw data stored in the raw data storage based on the data description metadata and at least one of the reporting data requirements using the interest-driven data sharing server system, calculating redundant data metadata based on the located previously generated reports and the identified raw data using the interest-driven data sharing server system, where the redundant data metadata identifies data common to the identified raw data and the previous reporting data in the located previously generated reports, determining modified reporting data requirements using the interest-driven data sharing server system, where the modified reporting data requirements exclude the common data identified by the redundant data metadata, retrieving updated source data based on the modified reporting data requirements using the interest-driven data sharing server system, and generating reporting data based on the updated source data and the previous reporting data contained in at least one of the at least one previously generated reports using the interest-driven data sharing server system.

In yet another additional embodiment of the invention, interest-driven data sharing further includes generating the reporting data utilizing an interest-driven data pipeline within the interest-driven data sharing server system, where the interest-driven data pipeline is configured to aggregate the updated data and the previous reporting data based on the report specification.

In still another additional embodiment of the invention, interest-driven data sharing further includes configuring the interest-driven data pipeline to generate a data source job configured to retrieve updated source data from a raw data storage system separate and remote from the interest-driven data sharing server system using the interest-driven data sharing server system.

In yet still another additional embodiment of the invention, the data source job configures the raw data storage to generate aggregate data based on raw data, where a portion of the raw data includes unstructured data.

In yet another embodiment of the invention, interest-driven data sharing further includes calculating redundant metadata based on the data dimension directory and the at least one reporting data requirement using the interest-driven data sharing server system, where the data dimension directory, where the data dimension directory includes a plurality of data dimensions associated with the previously generated reports and the at least one reporting data requirement includes at least one reporting data dimension.

In still another embodiment of the invention, interest-driven data sharing further includes updating the data dimension directory based on the generated reporting data using the interest-driven data sharing server system.

In yet still another embodiment of the invention, interest-driven data sharing further includes retrieving updated source data based on the modified reporting data requirements using the interest-driven data sharing server system, where the updated source data fulfills a portion of the modified reporting data requirement, generating partial reporting data based on the updated source data and the previous reporting data contained in at least one of the at least one previously generated reports using the interest-driven data sharing server system, retrieving supplemental source data using the interest-driven data sharing server system, where the supplemental source data fulfills the remaining portion of the modified reporting data requirement, and generating reporting data based on the partial reporting data and the supplemental source data using the interest-driven data sharing server system.

In yet another additional embodiment of the invention, interest-driven data sharing further includes storing the updated source data using the interest-driven data sharing server system.

In still another additional embodiment of the invention, interest-driven data sharing further includes retrieving updated source data from at least one data source using the interest-driven data sharing server system, where at least one of the at least one reporting data requirement includes data source metadata identifying the at least one data source configured to store raw data.

In yet still another additional embodiment of the invention, interest-driven data sharing further includes generating data mapping metadata using the interest-driven data sharing server system, where the data mapping metadata identifies correspondences between the previous reporting data requirements and the received report specification using the data description metadata, calculating redundant data metadata based on the located previously generated reports, the identified raw data, and the data mapping metadata using the interest-driven data sharing server system, and generating reporting data based on the updated source data, the previous reporting data contained in at least one of the at least one previously generated reports, and the data mapping metadata using the interest-driven data sharing server system.

DETAILED DISCLOSURE OF THE INVENTION

Figure 1:
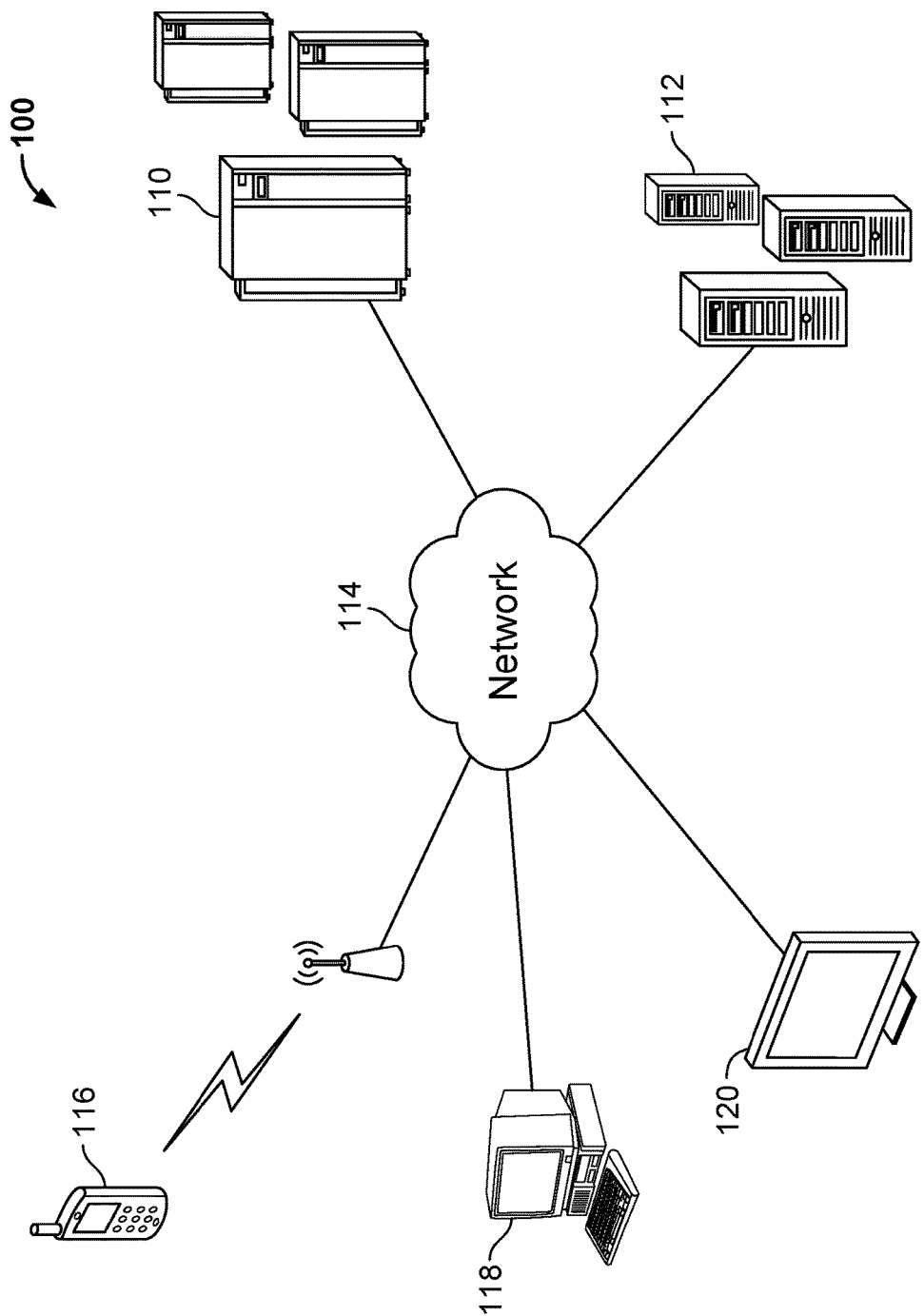
FIG. 1 is a network diagram of a business intelligence system including an interest-driven data sharing server system in accordance with an embodiment of the invention.

Turning now to the drawings, interest-driven data sharing server systems in accordance with embodiments of the invention are illustrated. Interest-driven data sharing server systems enable analysts using a variety of systems, including, but not limited to, interest-driven business intelligence systems, to create reporting data using raw data retrieved from interest-driven business intelligence systems and, at the same time, to dynamically create new reporting data by efficiently re-using and updating data previously retrieved from the interest-driven business intelligence system. Interest-driven data sharing server systems are configured to dynamically build an interest-driven data pipeline to provide analysts with information of interest. Interest-driven data sharing server systems are capable of managing huge datasets in a way that provides an analyst with complete visibility into the available data utilizing metadata provided by an interest-driven business intelligence system and the ability to dynamically reconfigure the interest-driven data sharing server system to provide access to desired information stored in the interest-driven business intelligence system. In order to achieve highly interactive performance, an interest-driven data sharing server system dynamically compiles an interest-driven data pipeline to create reporting data based on the reporting data requirements and reporting data currently present in the interest-driven data sharing server system. Changes specified at the report level can be automatically compiled and traced backward by the interest-driven data sharing server system to create an appropriate interest-driven data pipeline to meet the new report requirements. Interest-driven data sharing server systems further build metadata concerning the data available in the interest-driven business intelligence system and provide the metadata to interest-driven data visualization systems to enable the construction of reports using the metadata. Available data in an interest-driven business intelligence system includes, but is not limited to, raw data, aggregate data, filtered data, and reporting data. Interest-driven business intelligence systems that can be utilized in accordance with embodiments of the invention are discussed further in U.S. patent application Ser. No. 13/408,872 to Eshleman et al., titled "Interest-Driven Business Intelligence Systems and Methods of Data Analysis Using Interest-Driven Data Pipelines" and filed Feb. 29, 2012, the entirety of which is incorporated herein by reference.

In many embodiments, reports can be created using interest-driven data visualization systems configured to request and receive data from an interest-driven data sharing server system. In order for an interest-driven data visualization system to build reports, a set of reporting data requirements are defined. These requirements specify the reporting data, derived from raw data that will be utilized to generate the reports. The raw data can be structured, semi-structured, or unstructured. In a variety of embodiments, structured and semi-structured data include metadata, such as an index or other relationships, describing the data; unstructured data lacks any definitional structure. An interest-driven data sharing server system can utilize reporting data already created by the interest-driven data sharing server system and/or cause new and/or updated reporting data to be generated by the interest-driven data sharing server system to satisfy the reporting data requirements. In a variety of embodiments, reporting data requirements are received from interest-driven data visualization systems based upon reporting requirements defined by analysts exploring metadata describing raw data stored in an interest-driven business intelligence system. Systems and methods for interest-driven data visualizations systems which may be utilized in accordance with a number of embodiments are described in U.S. Provisional Patent Application No. 61/717,092 to Prabhu et al., titled "Systems and Methods for Interest-Driven Data Visualization Systems Utilized in Interest-Driven Business Intelligence Systems" and filed Oct. 22, 2012, the entirety of which is incorporated by reference.

In many embodiments, interest-driven data sharing server systems are configured to determine redundant data between currently existing reporting data and/or source data and the requested reporting data and to generate interest-driven business intelligence data job requests that reduce the amount of redundant reporting data generated. In this way, the computing time involved in generating reporting data satisfying a set of reporting data requirements can be reduced by reusing reporting data and/or source data that has already been derived from the raw data and that is stored within the interest-driven data sharing server system. Similar reporting data is frequently utilized in a variety of reporting data generated using raw data, aggregate data, filtered data, and or metadata describing raw data available from an interest-driven business intelligence system. In several embodiments, interest-driven data sharing server systems are configured to provide the sharing of reporting data between reports created by different users of interest-driven business intelligence systems and/or interest-driven data visualization systems. In several embodiments, interest-driven data sharing server systems are configured to identify a request for reporting data utilized in a previous report and provide an isolated snapshot of that reporting data, where the isolated snapshot of the reporting data contains updated reporting data corresponding to the data present in the previous reporting data. In many embodiments, interest-driven data sharing server systems are configured to identify when the data necessary to fulfill reporting data requirements is already present on the interest-driven data sharing server system in the form of reporting data and/or source data. The interest-driven data sharing server system is configured to generate jobs to perform any necessary aggregation and/or filtering of the existing reporting data and/or existing source data to create new reporting data fulfilling the reporting data requirements.

In a variety of embodiments, reporting data can be shared between business intelligence systems. In many embodiments, the business intelligence systems sharing the reporting data contain sources of similar raw data, aggregate data, and/or filtered data. Determining if interest-driven business intelligence systems can be performed in a variety of ways in accordance with many embodiments of the invention, including, but not limited to, comparing metadata describing the raw data available in each of the interest-driven business intelligence systems using an interest-driven data sharing server system. The reporting data can be shared in many ways, including sharing one or more reporting data schemas describing the reporting data and sharing the reporting data itself. A number of sharing techniques not listed above may be utilized in accordance with the requirements of particular embodiments of the invention. In several embodiments, the shared reporting data and/or shared reporting data schema is created using an interest-driven data sharing server system using source data generated using one of the interest-driven business intelligence systems. In many embodiments, the shared reporting data is pre-built reporting data and/or a pre-built reporting data schema is shared.

Interest-driven data sharing server systems are configured to provide reporting data based upon one or more reporting data requirements. Reporting data provided by interest-driven data sharing server systems includes raw data, aggregate data, and/or filtered data loaded from raw data storage received from the business intelligence systems that has been processed and loaded into a data structure to provide rapid access to the data. In a number of embodiments, this raw data, aggregate data, and/or filtered data is provided to interest-driven data sharing server systems as source data. In many embodiments, the source data is described by metadata describing the raw data, aggregate data, and/or filtered data present in the interest-driven business intelligence system and/or source data metadata describing the source data. In several embodiments, the source data, aggregate data, and/or reporting data is stored in a data mart or other aggregate data storage associated with the interest-driven data sharing server system and/or the internet-driven business intelligence system. Interest-driven data sharing server systems can load source data into a variety of reporting data structures in accordance with a number of embodiments, including, but not limited to, online analytical processing (OLAP) cubes. In a variety of embodiments, the reporting data structures are defined using a reporting data schema. In a number of embodiments, interest-driven data sharing server systems are configured to combine requests for one or more OLAP cubes into a single request, thereby reducing the time, storage, and/or processing power utilized by the interest-driven business intelligence system in creating source data utilized to create reporting data schemas and/or the reporting data.

Systems and methods for interest-driven data sharing server systems in accordance with embodiments of the invention are discussed further below.

System Overview

An interest-driven business intelligence system including an interest-driven data sharing server system in accordance with an embodiment of the invention is illustrated in FIG. 1. The interest-driven business intelligence system 100 includes a distributed computing platform 110 configured to store raw business data. The distributed computing platform 110 is configured to communicate with an interest-driven data sharing server system 112 via a network 114. In several embodiments of the invention, the network 114 is a local area network. In many embodiments, the distributed computing platform 110 communicates with the interest-driven data sharing server system 112 via the Internet 114. In many embodiments of the invention, the distributed computing platform 110 is a cluster of computers configured as a distributed computing platform. The distributed computing platform 110 can be configured to act as a raw data storage system and a data warehouse within the interest-driven business intelligence system. In several embodiments, the interest-driven data sharing server system 112 is also implemented using one or a cluster of computing devices. In a variety of embodiments, alternative distributed processing systems are utilized.

Interest-driven data visualization systems enable users to specify reports including data visualizations that enable the user to explore the raw data stored within the distributed computing platform 110 using reporting data generated by the interest-driven data sharing server system 112. Reporting data is provided in a variety of forms, including, but not limited to, snowflake schemas and star schemas. In many embodiments, reporting data is any data that includes fields of data populated using raw data stored within the distributed computing platform 110. The interest-driven data sharing server system 112 is configured to communicate via the network 114 with one or more interest-driven data visualization systems, including, but not limited to, cellular telephones 116, personal computers 118, and presentation devices 120. In many embodiments of the invention, interest-driven data visualization systems include any computing device capable of receiving and/or displaying data.

Based upon received reporting data requirements, the interest-driven data sharing server system 112 automatically compiles one or more interest-driven data pipelines to create or update reporting data to satisfy the received reporting data requirements. The interest-driven data sharing server system is configured to compile one or more interest-driven data pipelines configured to create and push down jobs to the distributed computing platform 110 to create source data and then applying various filter and/or aggregation processes to the source data to produce reporting data to be transmitted to interest-driven data visualization systems. In many embodiments, the interest-driven data sharing server system 112 includes reporting data that partially or fully satisfies the reporting data requirements. The interest-driven data sharing server system 112 is configured to identify the relevant existing reporting data and/or previously received source data and configure an interest-driven data pipeline to create jobs requesting reporting data minimizing the redundancy between the existing data and the new reporting data requirements. In a variety of embodiments, the interest-driven data sharing server system 112 is configured to determine redundancies between the requested data and existing data using metadata describing the data available from an interest-driven business intelligence system. The metadata describes what raw data is available from the interest-driven business intelligence system. In a number of embodiments, the metadata further describes what form the raw data is available in, such as, but not limited to, aggregate data, filtered data, source data, and reporting data. In several embodiments, the interest-driven data sharing server system 112 receives a plurality of reporting data requirements and the interest-driven data sharing server system 112 is configured to create jobs using the interest-driven data pipeline to create source data containing data fulfilling the union of the plurality of reporting data requirements. In a variety of embodiments, the interest-driven data sharing server system 112 is configured to identify redundant data requirements in one or more reporting data requirements and configure an interest-driven data pipeline to create jobs requesting source data fulfilling the redundant data requirements. In several embodiments, the interest-driven data sharing server system 112 is configured to store aggregate data and/or reporting data in a data mart and utilized the stored aggregate data and/or reporting data to identify the redundant data requirements. In a number of embodiments, the interest-driven data sharing server system 112 is configured to identify when reporting data requirements request updated data for existing reporting data and/or source data and configure an interest-driven data pipeline to create jobs to retrieve an updated snapshot of the existing reporting data from the distributed computing platform 110. In a variety of embodiments, redundant information is identified using reporting data schemas defining the structure of reporting data and/or source data schemas defining the structure of source data. In many embodiments, redundant information is determined using one or more files stored using the interest-driven data sharing server system; redundancies can be determined using the data contained in the files and/or metadata associated with the files, including the creation date of the files and/or the last modified date of the files.

In several embodiments, jobs pushed down to the distributed computing platform 110 by the interest-driven data sharing server system 112 cannot be executed in a low-latency fashion. In many embodiments, the distributed computing platform 110 is configured to provide a partial set of source data fulfilling the pushed down job and the interest-driven data sharing server system 112 is configured to create reporting data using the partial set of source data. As more source data is provided by the distributed computing platform 110, the interest-driven data sharing server system 112 is configured to update the created reporting data based upon the received source data. In a number of embodiments, the interest-driven data sharing server system will continue to update the reporting data until a termination condition is reached. These termination conditions can include, but are not limited to, a certain volume of source data is received, the source data provided is no longer within a particular time frame, and an amount of time to provide the source data has elapsed. In a number of embodiments, a time frame and/or the amount of time to provide the source data is determined based upon the time previously measured in the retrieval of source data for similar reporting data requirements.

The interest-driven data sharing server system 112 is configured to compile an interest-driven data pipeline to create jobs to be pushed down to the distributed computing platform 110 in order to retrieve data. In a variety of embodiments, the jobs created using the interest-driven data pipeline are tailored to the reporting data requirements. In many embodiments, the jobs created using the interest-driven data pipeline are customized to the hardware resources available on the distributed computing platform 110. In a number of embodiments, the jobs are configured to dynamically reallocate the resources available on the distributed computing platform 110 in order to best execute the jobs. In several embodiments, the jobs are created using performance metrics collected based upon the performance of previously executed jobs.

Raw data storage is utilized to store raw data, metadata storage is utilized to store data description metadata describing the raw data, and/or report storage is utilized to store previously generated reports including previous reporting data and previous reporting data requirements in a variety of embodiments of the invention. Raw data storage, metadata storage, and/or report storage can be a portion of the memory associated with the interest-driven data sharing server system 112, the distributed computing platform 110, and/or a separate device in accordance with the specific requirements of specific embodiments of the invention.

Although a specific architecture for an interest-driven business intelligence system with an interest-driven data sharing server system in accordance with an embodiment of the invention is conceptually illustrated in FIG. 1, any of a variety of architectures configured to store large data sets and to automatically build interest-driven data pipelines based upon reporting data requirements can also be utilized. Systems and methods for interest-driven data sharing server systems in accordance with embodiments of the invention are discussed further below Interest-Driven Data Sharing Server Systems Interest-driven data sharing server systems in accordance with embodiments of the invention are configured to create jobs to request source data from interest-driven business intelligence systems based upon received reporting data requirements and to create reporting data using the received source data. In many embodiments, the interest-driven data sharing server systems are further configured to determine redundancies between previously received source data and generated reporting data and create jobs that efficiently request additional source data from interest-driven business intelligence systems to reduce requests for redundant data. An interest-driven data sharing server system in accordance with an embodiment of the invention is conceptually illustrated in FIG. 2. The interest-driven data sharing server system 200 includes a processor 210 in communication with volatile memory 220 and non-volatile memory 230. The interest-driven data sharing server system 200 also includes a network interface 240 configured to send and receive data over a network connection. In a number of embodiments, the network interface 240 is in communication with the processor 210, the non-volatile memory 230, and the volatile memory 220.

In several embodiments, non-volatile memory is any form of non-volatile storage configured to store a variety of data, including, but not limited to, reporting data 234 and source data 236. In the illustrated embodiment, the non-volatile memory 230 is also configured to store an interest-driven data sharing application 232 that configures the processor 210 to perform an interest-driven data sharing processes. In many embodiments, interest-driven data sharing processes include efficiently creating jobs using an interest-driven data pipeline to retrieve source data from an interest-driven business intelligence system based upon redundancies between reporting data requirements and existing reporting data schemas 234 and/or source data schemas 236. In a variety of embodiments, interest-driven data sharing processes include iteratively updating reporting data based upon incrementally received source data. In several embodiments, interest-driven data sharing processes include creating jobs using an interest-driven data pipeline to retrieve updates to existing reporting data 234 and/or source data 236 from an interest-driven business intelligence system based upon the content of the existing reporting data schemas 234, source data schemas 236, and/or metadata describing data available from an interest-driven business intelligence system. A number of interest-driven data sharing processes not specifically described above may be utilized in accordance with the requirements of specific applications in accordance with embodiments of the invention. The non-volatile memory 230 further includes aggregate data storage 238 configured to store data received by the interest-driven data sharing server system 200, including, but not limited to, aggregate data, source data, and reporting data. In a variety of embodiments, the aggregate data storage 238 is configured as a data mart.

In many embodiments, reporting data schemas 234, source data schemas 236, and/or the interest-driven data sharing application 232 are stored using an external server system and received by the interest-driven data sharing server system 200 using a network interface 240. External server systems in accordance with a variety of embodiments include, but are not limited to, interest-driven business intelligence systems, distributed computing platforms, and interest-driven data sharing server systems. In several embodiments, the processor 210 is configured to transmit jobs using the network interface 240.

Figure 2:
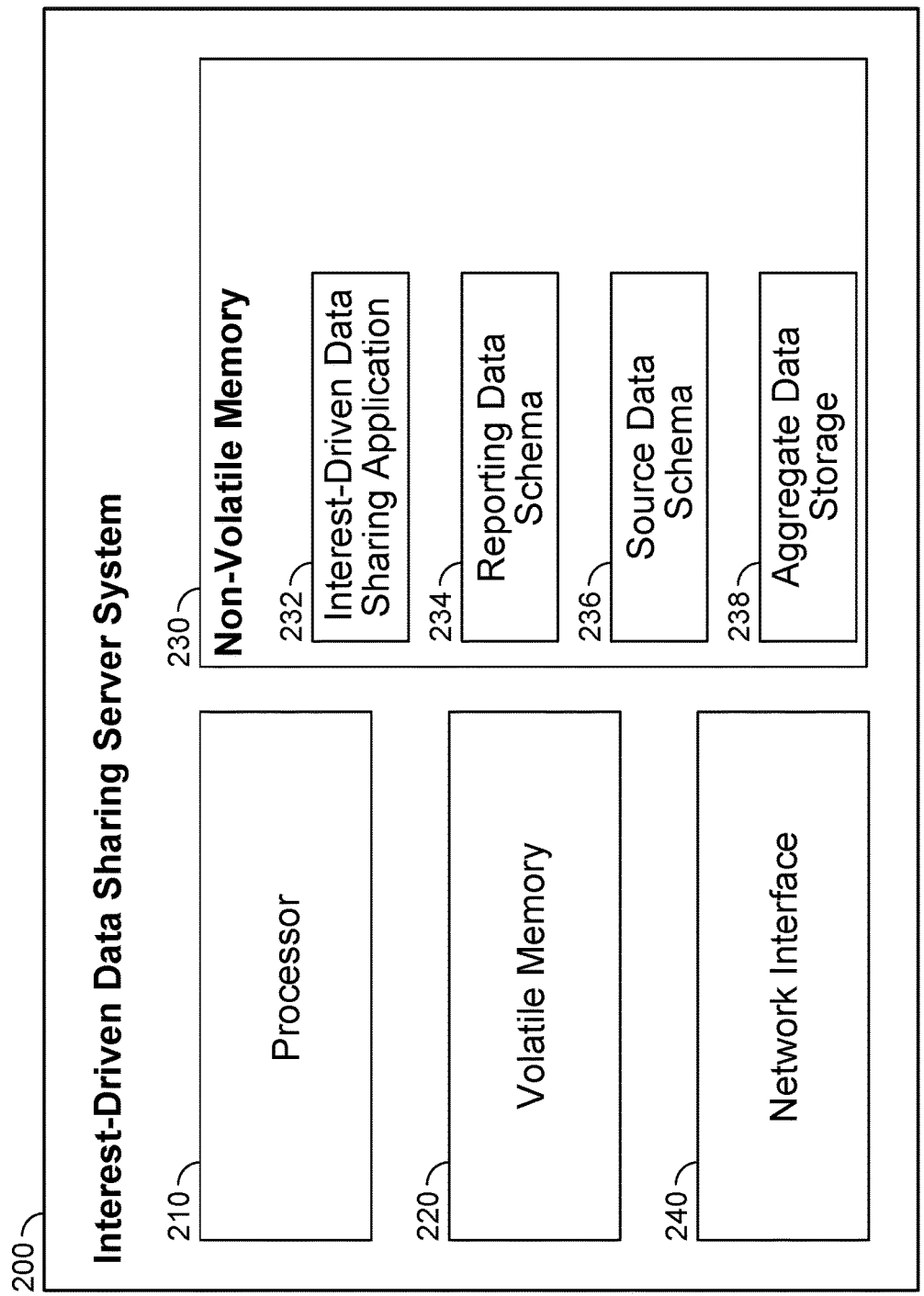
FIG. 2 is a conceptual illustration of an interest-driven data sharing server system in accordance with an embodiment of the invention.

Although a specific architecture for an interest-driven data sharing server system in accordance with an embodiment of the invention is conceptually illustrated in FIG. 2, any of a variety of architectures, including those that store data or applications on disk or some other form of storage and are loaded into volatile memory 220 at runtime, can also be utilized. Methods for interest-driven data sharing in accordance with embodiments of the invention are discussed further below.

Interest-Driven Data Sharing with Redundancies

Figure 3:
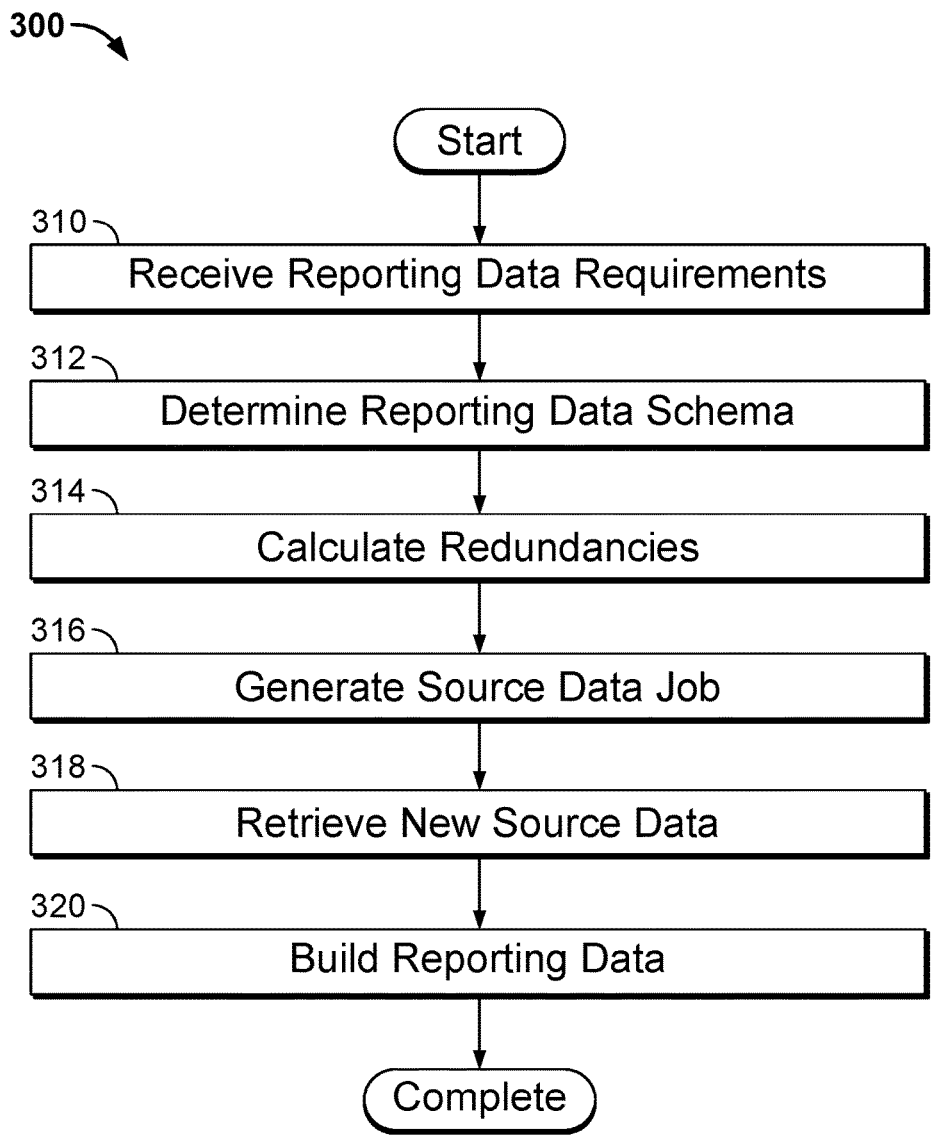
FIG. 3 is a flow chart illustrating a process for the interest-driven sharing of data in accordance with an embodiment of the invention.

In a variety of embodiments, interest-driven data sharing server systems are configured to determine redundancies between requested reporting data and data currently existing in the interest-driven data sharing server system and create jobs to request only new data. A process for interest-driven data sharing with redundant data in accordance with an embodiment of the invention is illustrated in FIG. 3. The process 300 includes receiving (310) reporting data requirements. A reporting data schema is determined (312) based upon the received (310) reporting data requirements. Redundancies are calculated (314). A source data job is generated (316). New source data is retrieved (318). Reporting data is built (320).

In many embodiments, reporting data requirements are received (310) from an interest-driven data visualization system. In several embodiments, the received (310) reporting data requirements are based upon metadata describing raw data stored in an interest-driven business intelligence system. In a number of embodiments, the reporting data schema is determined (312) using the received (310) reporting data requirements. In a variety of embodiments, reporting data schemas may be defined (312) in a number of formats including, but not limited to, star schemas and snowflake schemas. In several embodiments, calculating (314) redundancies includes comparing the determined (312) reporting data schema against reporting data schemas and/or source data schemas present in an interest-driven data sharing server system. In a number of embodiments, calculating (314) redundancies includes building a dictionary of dimensions contained in schemas defining existing reporting data and/or source data and comparing the dictionary of dimensions against the determined (312) reporting data schema. In many embodiments, a dimension directory includes a listing of dimensions in reporting data and/or source data stored in a data mart associated with an interest-driven business intelligence system and/or interest-driven data sharing server system. In a variety of embodiments, the dimension directory includes dimension directory metadata describing the location of the dimensions within the file system of the interest-driven business intelligence system and/or the interest-driven data sharing server system. In several embodiments, the dimension directory metadata includes ETL process definitions describing ETL processes that were utilized to generate the dimensions described in the dimension directory. In a variety of embodiments, the ETL process definitions include analyzing ETL processes for one or more pieces of reporting data and/or source data described in the dimension directory and creating one or more updated ETL processes incorporating the analyzed ETL processes. In several embodiments, redundancies are identified and/or optimizations are performed with respect to the analyzed ETL processes in the creation of the updated ETL process. In a variety of embodiments, the analyzed ETL processes are refreshed and/or updated based on the analysis. In a number of embodiments, comparing the dimension directory against the reporting data schema includes identifying corresponding dimensions in the directory of dimensions with dimensions in the reporting data schema. In many embodiments, calculating (314) redundancies includes comparing join indices in schemas defining existing reporting data and/or source data and the join indices of the determined (312) schema. In several embodiments, a join index is data describing a joined relation between two or more sets of data; the join index can also include aggregate data associated with the joined sets of data. In a variety of embodiments, calculating (314) redundancies includes comparing files stored on the interest-driven data sharing server system associated with the existing reporting data and/or existing source data with the determined (312) schema. In several embodiments, the calculated (314) redundancies are stored using redundant data metadata describing data common to the identified raw data and the previous reporting data in the located previously generated reports In a number of embodiments, the source data job is generated (316) using an interest-driven data pipeline. In many embodiments, the generated (316) source data job is based upon metadata describing raw data available from an interest-driven business intelligence system. In a variety of embodiments, the generated (316) source data job retrieves data requested in the reporting data requirements that reduces the calculated (314) redundancy. In a variety of embodiments, the generated (316) source data job is configured to retrieve data from a plurality of data sources associated with an interest-driven business intelligence system. Systems and methods for retrieving data from multiple data sources that can be utilized in accordance with embodiments of the invention are disclosed in U.S. patent application Ser. No. 13/790,624, titled "Systems and Methods for Interest-Driven Distributed Data Server Systems" and filed Mar. 8, 2013, the entirety of which is hereby incorporated by reference. In several embodiments, the new source data is retrieved (318) from an interest-driven business intelligence system. In a variety of embodiments, the new source data is retrieved (318) from a plurality of data sources associated with an interest-driven business intelligence system. In many embodiments, the retrieved (318) source data includes a source data schema defining the dimensions and facts of the retrieved (318) source data. In a number of embodiments, the retrieved (318) source data includes metadata describing the data sources from which the source data was retrieved (318).

In a number of embodiments, building (320) reporting data includes combining the source data schema of the retrieved (318) source data with the reporting data schemas defining the existing reporting data and/or source data to create reporting data having a reporting data schema fulfilling the reporting data schema determined (312) using the received (310) reporting data requirements. Building (320) reporting data then includes retrieving the data corresponding to the new reporting data schema. In several embodiments, the calculation (314) of redundancies between the determined (312) schema and the retrieved (318) new source data is performed as the reporting data is built (320). In a variety of embodiments, the reporting data built (320) is a materialized data mart. Materialized data marts in accordance with several embodiments of the invention are relational databases containing data fulfilling the reporting data requirements; the materialized data marts can be queried like any other relational database and used to create additional reporting data. In many embodiments, building (320) reporting data includes combining files associated with the existing reporting data and/or existing source data with the retrieved (318) source data. In a variety of embodiments, data stored in materialized data marts is aggregated and/or filtered to create additional data stored in the materialized data mart. In several embodiments, data stored in multiple data marts can be combined in order to create new reporting data.

Although a specific process for interest-driven data sharing with redundancies is described above with respect to FIG. 3, any of a variety of processes may be utilized in accordance with embodiments of the invention. Additional processes for interest-driven data sharing in accordance with embodiments of the invention are discussed further below.

Snapshot Isolation in Interest-Driven Data Sharing Server Systems

Figure 4:
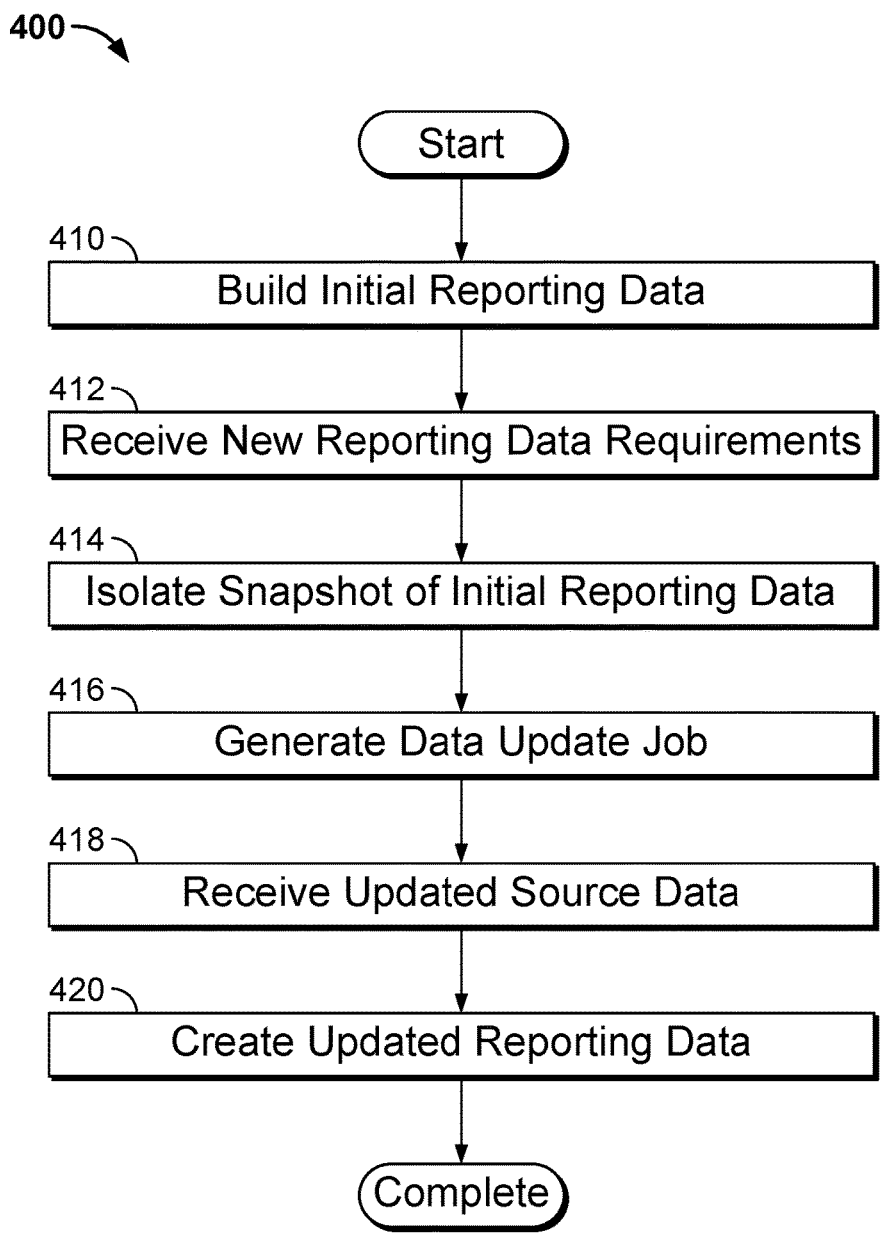
FIG. 4 is a flow chart illustrating a process for snapshot isolation in an interest-driven data sharing server system in accordance with an embodiment of the invention.

Typically, reporting data is generated by interest-driven data sharing server systems with respect to raw data available at a particular point in time. In many cases, analysts later create reports reflecting an updated view of the previously generated reporting data without disrupting the previously created reporting data. Interest-driven data sharing server systems are configured to create a snapshot isolating the previously created reporting data to preserve reports relying upon the previously created reporting data and generate jobs requesting updated reporting data to fulfill the new report requirements. A process for snapshot isolation in interest-driven data sharing server systems in accordance with an embodiment of the invention is illustrated in FIG. 4. The process 400 includes building (314) initial reporting data. New reporting data requirements are received (412). A snapshot of the initial reporting data is isolated (414). A data update job is generated (416). Updated source data is received (418). Updated reporting data is created (420).

In many embodiments, reporting data requirements are received (410) from an interest-driven data visualization system. In several embodiments, the received (410) reporting data requirements are based upon metadata describing raw data stored in an interest-driven business intelligence system. In several embodiments, isolating (414) a snapshot of the initial reporting data utilizes the received (412) new reporting data requirements. In a variety of embodiments, determining when a snapshot of the initial reporting data should be isolated (414) utilizes metadata describing updated raw data available from an interest-driven business intelligence system. In several embodiments, the snapshot is isolated (414) before the data update job is generated (416) and/or the updated source data is received (418). In many embodiments, the snapshot is isolated (414) after the data update job is generated (416) and/or the updated source data is received (418).

In a number of embodiments, the data update job is generated (416) using an interest-driven data pipeline. In many embodiments, the generated (416) data update job is based upon metadata describing raw data available from an interest-driven business intelligence system. In a variety of embodiments, the generated (416) data update job is configured to retrieve only the data that has been updated since the time that the initial reporting data was built (410); additional data can be retrieved along with the updated data as appropriate to specific requirements of specific embodiments of the invention. The time the initial reporting data was built (410) can be determined in a number of ways in accordance with embodiments of the invention, including, but not limited to, metadata associated with the initial reporting data, files storing the initial reporting data, the directory structure of the files storing the initial reporting data, and/or metadata associated with the files. Metadata associated with a file in accordance with many embodiments of the invention includes, but is not limited to, the creation date of the file, and the last modified date of the file. In a variety of embodiments, the generated (416) data update job is configured to retrieve data from a plurality of data sources associated with an interest-driven business intelligence system.

In several embodiments, the updated source data is received (418) from an interest-driven business intelligence system. In many embodiments, the received (418) updated source data includes a source data schema defining the dimensions and facts of the received (418) updated source data. In a number of embodiments, the received (418) updated source data includes metadata describing the data source providing the updated source data. In many embodiments, creating (420) the updated reporting data includes combining the source data schema for the updated source data with the reporting data schema for the initial reporting data. In a variety of embodiments, building (420) reporting data includes combining files associated with the existing reporting data and/or existing source data with the retrieved (418) source data. In several embodiments, creating (420)

the updated reporting data includes logically eliminating redundant data between the initial reporting data and the updated source data.

Although a specific process for snapshot isolation in interest-driven data sharing server systems is illustrated in FIG. 4, any of a variety of processes can be utilized in accordance with embodiments of the invention. Processes for iterative reporting data generation in accordance with embodiments of the invention are discussed further below.

Figure 5:
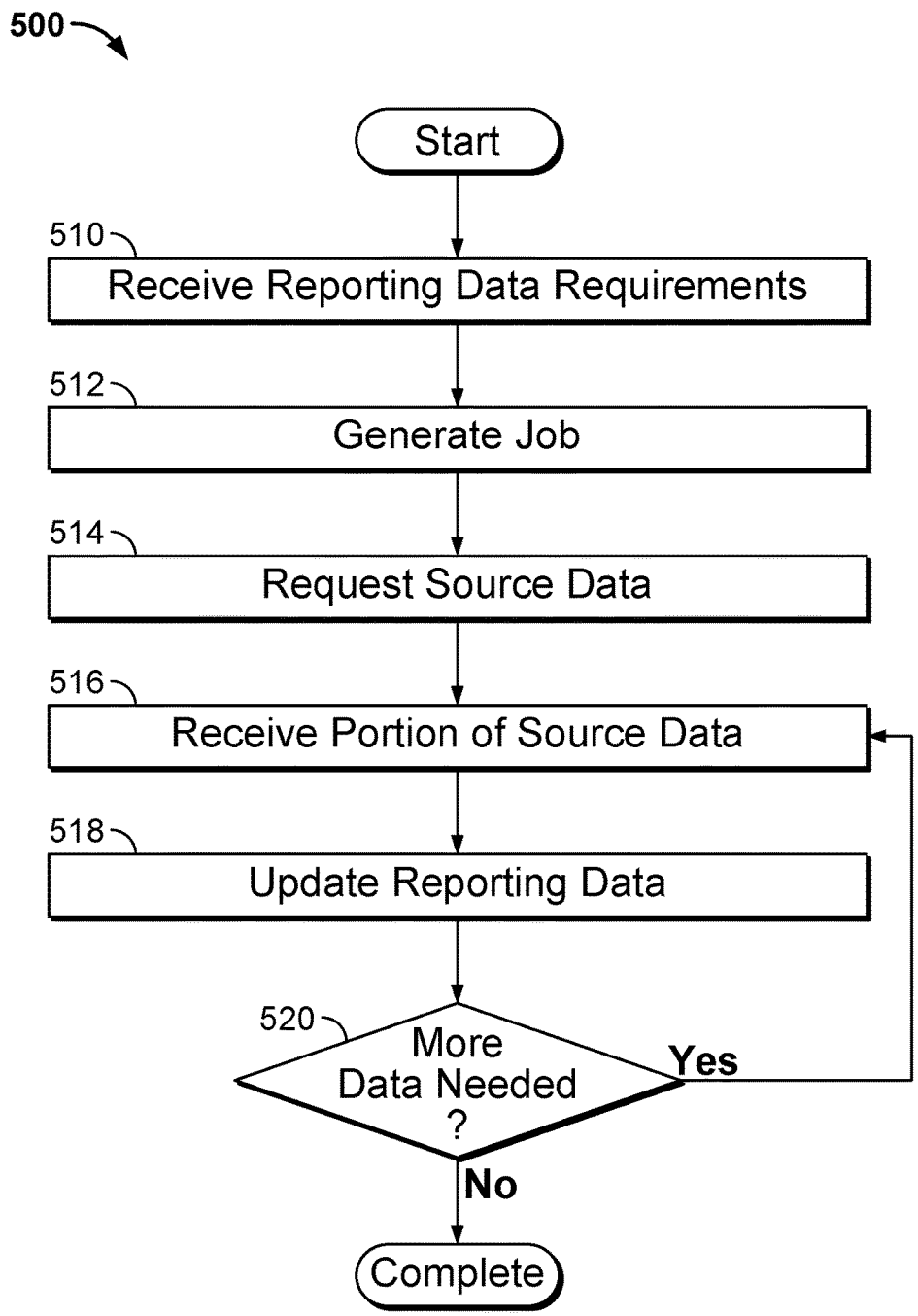
FIG. 5 is a flow chart illustrating a process for iterative reporting data generation in an interest-driven data sharing server system in accordance with an embodiment of the invention.

Iterative Reporting Data Generation in Interest-Driven Data Sharing Server Systems Interest-driven data sharing server systems are configured to create reporting data using source data received from an interest-driven business intelligence system. Interest-driven data sharing server systems create jobs to be pushed down to interest-driven business intelligence systems in order to create and retrieve source data that can be used to generate desired reports. However, the interest-driven business intelligence system providing the source data may not be able to execute the job in a low-latency fashion in all cases. In order to provide reporting data in a timely fashion, interest-driven data sharing server systems are configured to incrementally retrieve source data and create reporting data in an iterative fashion utilizing the incrementally received source data. A process for iterative reporting data generation in accordance with an embodiment of the invention is illustrated in FIG. 5. The process 500 includes receiving (510) reporting data requirements. A job is generated (512). Source data is requested (514). A portion of the source data is received (516). Reporting data is updated (518). If additional source data is needed (520), another portion of the source data is received (516). If no more data is needed (520), the process completes.

In many embodiments, reporting data requirements are received (510) from an interest-driven data visualization system. In several embodiments, the received (510) reporting data requirements are based upon metadata describing raw data stored in an interest-driven business intelligence system. In a number of embodiments, the job is generated (512) using an interest-driven data pipeline. In many embodiments, the generated (512) job is based upon metadata describing raw data available from an interest-driven business intelligence system. In a variety of embodiments, the generated (512) job retrieves only the source data that has not been previously received (516). The source data that has been previously received (516) can be determined in a number of ways in accordance with embodiments of the invention, including, but not limited to, metadata associated with the source data, files storing the source data, the directory structure of the files storing the source data, and/or metadata associated with the files. Metadata associated with a file in accordance with many embodiments of the invention includes, but is not limited to, the creation date of the file and the last modified date of the file.

Typically, source data is requested (514) from an interest-driven business intelligence system. Source data may be requested (514) from a variety of other data sources in accordance with the requirements of a particular embodiment of the invention. A received (516) portion of source data can be any variety of portions of source data in accordance with many embodiments of the invention. Portions of source data may be determined according to a variety of criteria including, but not limited to, the time span of the portion of source data, the time required to receive (516) the portion of source data, the size of the portion of source data received (516), requests for additional portions of source data, and the availability of resources on the business intelligence system providing the source data. A number of processes may be utilized to update (518) the reporting data using the received (516) portion of source data. These processes include, but are not limited to, those described above with respect to FIG. 3 and FIG. 4. Many conditions may be utilized to determine if more data is needed (520) including, but not limited to, those described above with respect to receiving (516) portions of source data. In many embodiments, as portions of source data are received, the estimate of the time and/or space required to receive the remaining portions of source data is updated.

Although a specific process for iterative reporting data generation using interest-driven data sharing server systems is described above with respect to FIG. 5, any of a variety of processes may be utilized in accordance with embodiments of the invention. Processes for sharing reporting data between interest-driven business intelligence systems using interest-driven data sharing server systems in accordance with embodiments of the invention are discussed below.

Sharing Reporting Data Using Interest-Driven Data Sharing Server Systems

Figure 6:
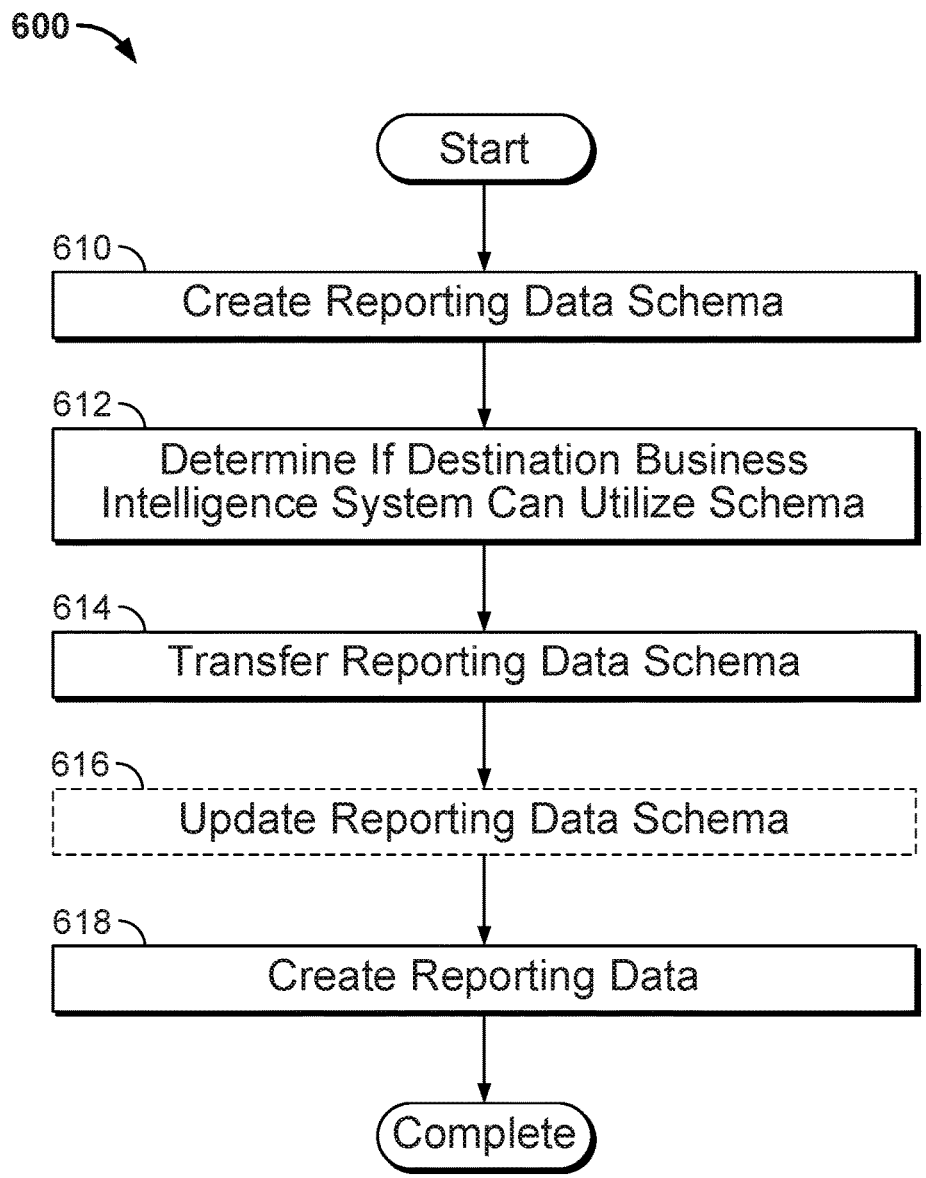
FIG. 6 is a flow chart illustrating a process for sharing reporting data between business intelligence systems using interest-driven sharing systems in accordance with an embodiment of the invention.

In a variety of embodiments, interest-driven data sharing server systems are configured to share reporting data and/or reporting data schemas between interest-driven business intelligence systems capable of generating similar source data and/or source data metadata. A process for sharing reporting data in accordance with an embodiment of the invention is illustrated in FIG. 6. The process 600 includes creating (610) a reporting data schema. A determination is made (612) if a second interest-driven business intelligence system can generate source data to materialize the reporting data schema. The reporting data schema is transferred (614) to the second interest-driven business intelligence system. In a variety of embodiments, the reporting data schema is updated (616). Reporting data is created (618).

In many embodiments, the created (610) reporting data schema is based upon reporting data requirements determined using metadata describing raw data available from a first interest-driven business intelligence system. In a variety of embodiments, the created (610) reporting data schema is a pre-built reporting data schema. In several embodiments, determining (612) if the destination interest-driven business intelligence system can utilize the created (610) reporting data schema involves comparing metadata describing raw data available on the first interest-driven business intelligence system with metadata describing raw data available on the destination interest-driven business intelligence system. In a number of embodiments, the reporting data schema will be shared if there is a certain amount of overlap between the raw data available; this threshold amount may be pre-determined and/or determined dynamically. In many embodiments, the reporting data schema is only transferred (614) if the determination (612) indicates that the reporting data schema can be materialized into reporting data using the destination interest-driven business intelligence system. In many embodiments, the reporting data schema (616) is updated based upon the availability of data from the destination interest-driven business intelligence system. In a variety of embodiments, the availability of data on the destination interest-driven business intelligence system is determined using metadata describing the raw data available along with any aggregate data and/or filtered data. The update (616) can performed using a variety of systems in accordance with embodiments of the invention, including interest-driven data sharing server systems and interest-driven data visualization systems. The update may be performed automatically by a machine or by input received from an analyst in accordance with the requirements of particular embodiments of the invention. In several embodiments, reporting data is created (618) using source data generated by the destination interest-driven business intelligence system in response to a job generated using an interest-driven data sharing server system using the transferred (614) reporting data requirements. In many embodiments, the job is generated using the updated (616) reporting data. In a number of embodiments, the reporting data is created (618) using a variety of processes, including those described above with respect to FIG. 3, FIG. 4, and FIG. 5, depending on the requirements of particular embodiments of the invention.

A specific process for sharing reporting data generated using interest-driven data sharing server systems between interest-driven business intelligence systems is described above with respect to FIG. 6; however, any of a variety of processes may be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An interest-driven data sharing server system, comprising:
   a processor;
   a memory connected to the processor and configured to store an interest-driven data sharing application;
   raw data storage configured to store raw data, where a portion of the raw data comprises unstructured data;
   metadata storage configured to store data description metadata describing the raw data; and
   report storage configured to store previously generated reports comprising previous reporting data and previous reporting data requirements, wherein the report storage is separate from the interest-driven data sharing server system;
   wherein the interest-driven data sharing application configures the processor to:
      receive a report specification, where the report specification comprises at least one reporting data requirement;
      locate at least one previously generated report stored in the report storage using the previously reporting data requirements and the at least one reporting data requirement;
      identify raw data stored in the raw data storage using the data description metadata and at least one of the reporting data requirements;
      generate data mapping metadata, wherein the data mapping metadata identifies correspondences between the previous reporting data requirements and the received report specification using the data description metadata;
      calculate redundant data metadata using the located previously generated reports and the identified raw data based on the data mapping metadata, comprising to:
         identify data common to the identified raw data and the previous reporting data in the located previously generated reports based on a comparison of a file stored on the interest-driven data sharing server system, existing source data, or both and a determined schema, the determined schema being determined based on the at least one reporting data requirement;
      determine modified reporting data requirements, where the modified reporting data requirements exclude the common data identified by the redundant data metadata;
      retrieve updated source data from the raw data storage using the modified reporting data requirements; and
      generate reporting data based on the updated source data and the previous reporting data contained in at least one of the at least one previously generated reports.

2. The system of claim 1, wherein the interest-driven data sharing application configures the processor to generate the reporting data utilizing an interest-driven data pipeline, where the interest-driven data pipeline is configured to aggregate the updated data and the previous reporting data based on the report specification.

3. The system of claim 1, wherein:
   the raw data storage is separate and remote from the interest-driven data sharing server system; and
   the interest-driven data sharing application configures the processor to generate a data source job configured to retrieve updated source data from the raw data storage.

4. The system of claim 3, wherein the data source job configures the raw data storage to generate aggregate data based on raw data, where a portion of the raw data comprises unstructured data.

5. The system of claim 1, further comprising a data dimension directory, where the data dimension directory comprises a plurality of data dimensions associated with the previously generated reports;
   wherein the at least one reporting data requirement comprises at least one reporting data dimension; and
   wherein the interest-driven data sharing application configures the processor to calculate redundant metadata based on the data dimension directory and the at least one reporting data requirement.

6. The system of claim 5, wherein the interest-driven data sharing application configures the processor to update the data dimension directory based on the generated reporting data.

7. The system of claim 1, wherein the interest-driven data sharing application configures the processor to:
   retrieve updated source data from the raw data storage using the modified reporting data requirements, where the updated source data fulfills a portion of the modified reporting data requirement;
   generate partial reporting data based on the updated source data and the previous reporting data contained in at least one of the at least one previously generated reports;
   retrieve supplemental source data from the raw data storage, where the supplemental source data fulfills the remaining portion of the modified reporting data requirement; and
   generate reporting data using the partial reporting data and the supplemental source data.

8. The system of claim 7, further comprising aggregate data storage configured to store aggregate data;

wherein the updated source data comprises aggregate data; and wherein the interest-driven data sharing application configures the processor to store the updated source data using the aggregate data storage.

9. The system of claim 1, wherein:

at least one of the at least one reporting data requirement comprises data source metadata identifying at least one data source, where the at least one data source is configured to store raw data; and the interest-driven data sharing application configures the processor to retrieve updated source data from the at least one data source.

10. A method for interest-driven data sharing, comprising:

receiving a report specification using an interest-driven data sharing server system, where the report specification comprises at least one reporting data requirement;

locating at least one previously generated report stored in report storage based on previously reporting data requirements and the at least one reporting data requirement using the interest-driven data sharing server system, wherein the report storage is separate from the interest-driven data sharing server system;

identifying raw data stored in raw data storage based on data description metadata and at least one of the reporting data requirements using the interest-driven data sharing server system;

generating data mapping metadata, wherein the data mapping metadata identifies correspondences between the previous reporting data requirements and the received report specification using the data description metadata;

calculating redundant data metadata using the located previously generated reports and the identified raw data based on the data mapping metadata, comprising:

identifying data common to the identified raw data and the previous reporting data in the located previously generated reports based on a comparison of a file stored on the interest-driven data sharing server system, existing source data, or both and a determined schema, the determined schema being determined based on the at least one reporting data requirement;

determining modified reporting data requirements using the interest-driven data sharing server system, where the modified reporting data requirements exclude the common data identified by the redundant data metadata;

retrieving updated source data based on the modified reporting data requirements using the interest-driven data sharing server system; and generating reporting data based on the updated source data and the previous reporting data contained in at least one of the at least one previously generated reports using the interest-driven data sharing server system.

11. The method of claim 10, further comprising generating the reporting data utilizing an interest-driven data pipeline within the interest-driven data sharing server system, where the interest-driven data pipeline is configured to aggregate the updated data and the previous reporting data based on the report specification.

12. The method of claim 10, further comprising configuring an interest-driven data pipeline to generate a data source job configured to retrieve updated source data from a raw data storage system separate and remote from the interest-driven data sharing server system using the interest-driven data sharing server system.

13. The method of claim 12, wherein the data source job configures the raw data storage to generate aggregate data based on raw data, where a portion of the raw data comprises unstructured data.

14. The method of claim 10, further comprising calculating redundant metadata based on a data dimension directory and the at least one reporting data requirement using the interest-driven data sharing server system, where the data dimension directory, where the data dimension directory comprises a plurality of data dimensions associated with the previously generated reports and the at least one reporting data requirement comprises at least one reporting data dimension.

15. The method of claim 14, further comprising updating the data dimension directory based on the generated reporting data using the interest-driven data sharing server system.

16. The method of claim 10, further comprising:

retrieving updated source data based on the modified reporting data requirements using the interest-driven data sharing server system, where the updated source data fulfills a portion of the modified reporting data requirement;

generating partial reporting data based on the updated source data and the previous reporting data contained in at least one of the at least one previously generated reports using the interest-driven data sharing server system;

retrieving supplemental source data using the interest-driven data sharing server system, where the supplemental source data fulfills the remaining portion of the modified reporting data requirement; and generating reporting data based on the partial reporting data and the supplemental source data using the interest-driven data sharing server system.

17. The method of claim 16, further comprising storing the updated source data using the interest-driven data sharing server system.

18. The method of claim 10, wherein at least one of the at least one reporting data requirement comprises data source metadata identifying the at least one data source configured to store raw data.

* * * * *